United States Patent
Grube et al.

[11] Patent Number: 5,720,833
[45] Date of Patent: Feb. 24, 1998

[54] HINGED SUPPORT OR THE LIKE FOR THE ARTICULATED CONNECTION OF CHASSIS PARTS IN MOTOR VEHICLES

[75] Inventors: Volker Grube, Diepholz; Alfons Nordloh, Visbek, both of Germany

[73] Assignee: Lemförder Metallwaren AG, Lemförde, Germany

[21] Appl. No.: 557,971

[22] Filed: Nov. 13, 1995

[30] Foreign Application Priority Data

Nov. 19, 1994 [DE] Germany .................. 44 41 219.3

[51] Int. Cl.⁶ .................................. B32B 31/16
[52] U.S. Cl. .............. 156/73.1; 156/73.5; 156/242; 156/292; 156/309.6; 264/68; 264/445
[58] Field of Search .................. 156/73.1, 73.5, 156/242, 292, 293, 304.1, 304.6, 308.2, 309.6; 264/442, 443, 445, 68

[56] References Cited

U.S. PATENT DOCUMENTS

| | | | |
|---|---|---|---|
| 3,985,601 | 10/1976 | Panagrossi | 156/229 |
| 4,782,580 | 11/1988 | Cacioppo et al. | 29/597 |
| 5,174,840 | 12/1992 | Anderson | 156/69 |
| 5,205,895 | 4/1993 | Hohman, Jr. et al. | 156/293 |
| 5,342,464 | 8/1994 | McIntire et al. | 156/172 |

*Primary Examiner*—James Sells
*Attorney, Agent, or Firm*—McGlew and Tuttle

[57] ABSTRACT

A hinged support or the like for the articulated connection of chassis parts in motor vehicles, in which a section connecting bearing eyes at the ends to one another is designed as a hollow section and is assembled from parts which are manufactured as shell-shaped open parts and are connected to one another after manufacture to form a closed hollow section.

11 Claims, 1 Drawing Sheet

U.S. Patent
Feb. 24, 1998
5,720,833
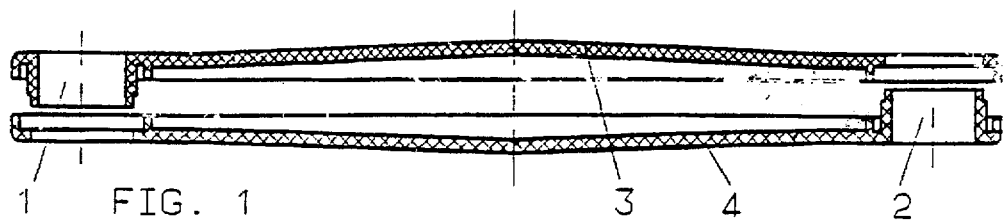
1    FIG. 1       3   4     2
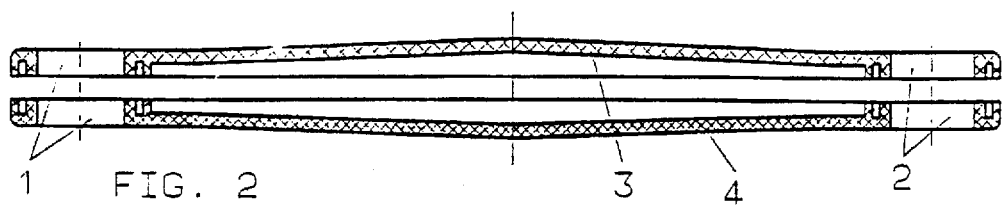
1    FIG. 2       3   4     2
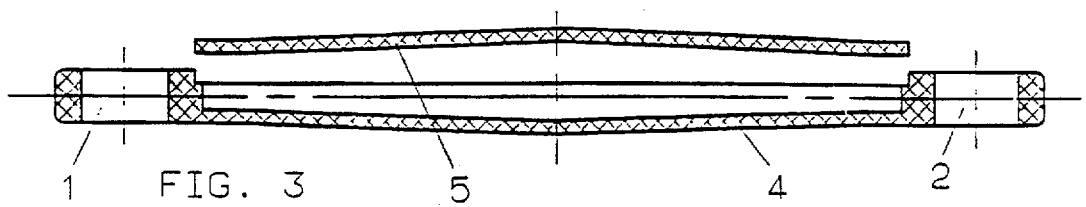
1    FIG. 3    5      4     2
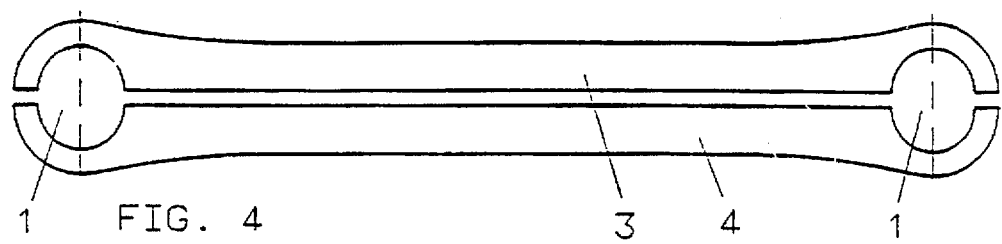
1    FIG. 4     3   4    1
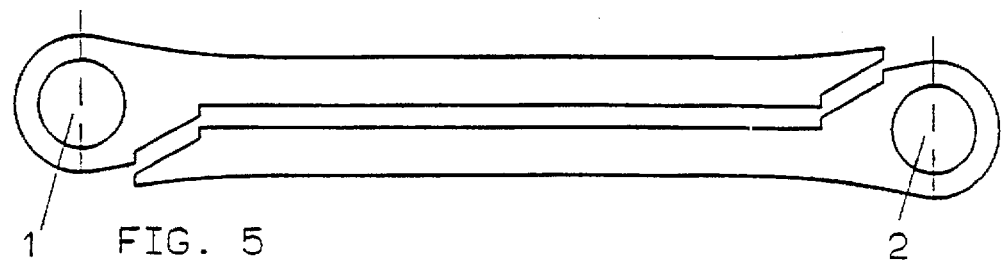
1    FIG. 5               2
FIG. 6        FIG. 7        FIG. 8
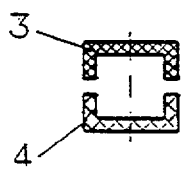 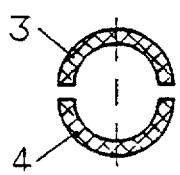 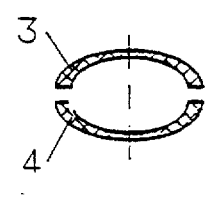

5,720,833

1

HINGED SUPPORT OR THE LIKE FOR THE ARTICULATED CONNECTION OF CHASSIS PARTS IN MOTOR VEHICLES

FIELD OF THE INVENTION

The present invention pertains to a hinged support or the like for the articulated connection of chassis parts in motor vehicles, in which bearing eyes, provided at ends of the hinged support, are connected to one another by a rod-shaped section.

BACKGROUND OF THE INVENTION

It has been known that such hinged supports are manufactured from plastics according to the injection molding process for the above-described or similar application in the chassis of a motor vehicle. However, only open sections can be manufactured at a low cost according to this process. This leads to a high tendency to the accumulation of dirt during practical use of the open sections of such hinged supports. The advantage in terms of weight achieved by injection molding from plastic compared with hinged supports made of steel is offset during practical use by the increasing accumulation of dirt. Despite expensive technology, it has not yet become possible to manufacture closed hollow sections which satisfy the high requirements imposed on the hinged support in practical use according to the so-called gas inner pressure process.

SUMMARY AND OBJECTS OF THE INVENTION

The primary object of the present invention is to provide a hinged support with a hollow inner profile which is closed in itself and can be manufactured according to the injection molding process, in order to thereby maintain the known advantages of low weight and at the same time to avoid disadvantages due to the accumulation of dirt.

According to the invention, a hinged support is provided for an articulated connection of chassis parts in motor vehicles. The hinged support includes bearing eyes provided at ends of the hinge support. The bearing eyes are connected to one another by a rod-shaped section. The rod-shaped section is designed as a hollow section formed of a first part and a second part. The first part and the second part are manufactured in the form of open shells defining a cavity and are tightly connected to one another to form a hollow section after the manufacture. The hollow section is closed so as to prevent dirt and other material from entering it. The open parts are preferably connected to one another according to a bonding technique, ultrasonic or orbital welding technique or by elastically deformable snap-in elements, the provision of the snap-in elements or the use of the bonding technique or one of the welding techniques is known per se.

The bearing eyes may be provided at the ends of the hinge support, made in one piece with one of the continuous shell parts. Additionally, the bearing eyes may be provided on each of the shell parts, manufactured in one piece with the associated shell part. The shell-shaped open components with the bearing eyes made partially or completely in one piece therewith are manufactured according to the injection molding process and are subsequently assembled to form a hollow section which is closed in itself (defines a hollow space closed off by the walls of the shell parts with the connection between the shell parts closing the hollow space from the exterior of the shell parts).

The assembly of the rod-shaped sections between the bearing eyes at the ends of the hinged support made of open

2 shell parts make it possible to manufacture these parts according to the injection molding process without tools. The rod-shaped section is assembled with an inner hollow space, which is closed in itself and is formed by two or more parts which are manufactured separately according to the injection molding process, wherein the parts are firmly and tightly connected to one another according to a prior-art joining technique. The suitable techniques include, e.g., bonding techniques or even ultrasonic or orbital welding techniques. A snap connection may also be used optionally for the shell parts manufactured separately, in which case elastically deformable snap-in parts on one part can preferably be pressed into corresponding recesses of the other part during elastic deformation. The bearing eyes at the ends of the hinged support may be provided, e.g., on a continuous shell part. However, it is also conceivable that the bearing eyes are provided each on separate shell parts and are manufactured in one piece with these shell parts. The known advantage of a hinged support of lower weight made of plastic is maintained at any rate. High stability and rigidity of the rod-shaped section with an inner hollow space, which is not subject to the accumulation of dirt, are achieved.

Box sections of high geometrical moments of inertia and section moduli are formed by the solution according to the present invention. It is possible to select smaller cross sections for a predetermined load, so that the space available for installation can be better utilized. The box sections also make possible a load-optimized design of the cross sections. Better utilization of material with smaller cross sections also leads to better utilization of material and thus also to cost savings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

The drawing shows exemplary embodiments of a hinged support of the design according to the present invention.

FIGS. 1 through 3 are longitudinal sectional views through different embodiments;

FIGS. 4 and 5 are side views of other embodiments; and

FIGS. 6 through 8 are different shapes of possible box-shaped hollow sections.

DETAILED DESCRIPTION OF THE PREFERRED EMBODIMENT

In the exemplary embodiment according to FIG. 1, the rod-shaped section between the two bearing eyes 1 and 2 provided at the bearing ends is made of two shell-shaped parts 3 and 4, which are connected to one another only after they have been manufactured. One of each of the bearing eyes 1 and 2 is provided on one of the shell parts 3 and 4 and is made in one piece therewith. To increase the stability, the respective other shell part is provided with a recess surrounding the bearing eye after assembling, as is clearly apparent from FIG. 1.

In the embodiment of FIG. 2, the two shell-shaped parts 3 and 4 are designed mirror-symmetrically and are placed on one another in mirror-image position with the open sides facing each other and they are connected to one another according to a suitable joining technique. In the exemplary embodiment according to FIG. 2, one half of the bearing eyes 1 and 2 is provided at the ends of continuous shell parts 3 and 4, so that two congruent parts are manufactured separately and can be connected to one another after the manufacture. Thus, only one mold is needed to manufacture the shell parts 3 and 4 with the bearing eyes 1 and 2 made in one piece with them in the halved design.

In contrast, in the exemplary embodiment according to FIG. 3, both bearing eyes 1 and 2 are provided at the ends of a shell-shaped sectional part 4, whose open section side is closed by a flat cover element 5 after the manufacture.

In the designs according to FIGS. 1 through 3, the parts to be assembled are parted in a plane extending at fight angles to the axes of the bearing eyes 1 and 2. In contrast, the parting line extends in a plane passing through the axis of the baring eyes 1 and 2 in the exemplary embodiments according to FIGS. 4 and 5.

FIG. 4 shows an exemplary embodiment comprising two congruent, shell-shaped components 3 and 4 shortly before the final assembly. The bearing eyes are provided in a semicircular form, with half a bearing eye at each end of the shell-shaped parts 3 and 4. Unlike the design according to FIG. 4, the parting of the shell-shaped parts 3 and 4 to be connected to one another is offset toward the bearing eyes 1 and 2. The cross-sectional views in FIGS. 6, 7 and 8 also belong to the exemplary embodiments according to FIGS. 4 and 5. FIGS. 6, 7 and 8 show rod-shaped hollow sections of the hinged support in sectional planes which are placed in parallel to the axial planes of the bearing eyes 1 and 2. To better illustrate the features of the present invention, the shell-shaped halves of the rod-shaped sections of the hinged support are shown in a not yet firmly assembled state in the area between the bearing eyes provided at the ends. Prior-art joining techniques may be used to connect the two parts 3 and 4. The connection may be performed, e.g., by a bonding technique, a welding technique or even by mechanical means, e.g., by a snap-in connection.

While specific embodiments of the invention have been shown and described in detail to illustrate the application of the principles of the invention, it will be understood that the invention may be embodied otherwise without departing from such principles.

What is claimed is:

1. A process for manufacturing a hinged support with a rod-shaped section having bearing eyes provided at ends thereof and including a hollow section between said bearing eyes, said hinged support being formed by the steps of:

providing a first open shell part;

providing a second open shell part, said bearing eyes being made in one piece with one of said first open shell part, said second open shell part or both said first and said second open shell parts;

forming said open shell parts of plastics using an injection molding process; and connecting said first open shell part to said second open shell part to form said hollow section, said hollow section being closed in itself.

2. A process according to claim 1, wherein said first open shell part and said second open shell part are tightly connected.

3. A process according to claim 1, wherein said open shell parts are tightly connected by one of bonding, ultrasonic or orbital welding, and elastically deformable snap-in elements.

4. A process according to claim 1, wherein said bearing eyes include bearing eye portions including first bearing eye portions formed in one piece with said first open shell part and second bearing eye portions formed in one piece with said second open shell part.

5. A process for manufacturing a hinged support, the process comprising the steps of:

providing a first open shell part defining an open cavity;

providing a second open shell part;

forming bearing eyes in one piece with one of said first open shell part, said second open shell part or both said first and said second open shell parts;

connecting said first open shell part to said second open shell part to close said open cavity of said first open shell part and form a closed hollow section.

6. A process in accordance with claim 5, wherein:

said first open shell has opposite longitudinal ends, an opening of said open cavity extends from one of said longitudinal ends to another of said longitudinal ends.

7. A process in accordance with claim 5, wherein:

said second open shell also defines an open cavity;

said connecting combining said open cavity of said first and second open shells into said closed hollow section.

8. A process in accordance with claim 7, wherein:

said first and second open shells are mirror images of each other.

9. A process according to claim 5, wherein:

said first open shell part and said second open shell part are tightly connected.

10. A process according to claim 5, wherein:

said open shell parts are tightly connected by one of bonding, ultrasonic or orbital welding, and elastically deformable snap-in elements.

11. A process according to claim 5, wherein:

said bearing eyes include bearing eye portions including first bearing eye portions formed in one piece with said first open shell part and second bearing eye portions formed in one piece with said second open shell part.

* * * * *